US012488972B2

(12) United States Patent
Rangan et al.

(10) Patent No.: US 12,488,972 B2

(45) Date of Patent: Dec. 2, 2025

(54) ATMOSPHERIC SOLIDS ANALYSIS SOURCE ASSEMBLY

(71) Applicant: Micromass UK Ltd, Wilmslow (GB)

(72) Inventors: Arvind Rangan, Singapore (SG); Veronica Lum, Singapore (SG); Carl Chen, Singapore (SG); Steven Rocha, Singapore (SG); Enchen Guo, Singapore (SG); Nicola Lumley, Wilmslow (GB); David Douce, Wilmslow (GB)

(73) Assignee: Micromass UK Limited, Wilmslow (GB)

( * ) Notice: Subject to any disclaimer, the term of this patent is extended or adjusted under 35 U.S.C. 154(b) by 468 days.

(21) Appl. No.: 17/998,005

(22) PCT Filed: May 5, 2021

(86) PCT No.: PCT/GB2021/051079

§ 371 (c)(1),
(2) Date: Nov. 4, 2022

(87) PCT Pub. No.: WO2021/224612

PCT Pub. Date: Nov. 11, 2021

(65) Prior Publication Data

US 2023/0170200 A1 Jun. 1, 2023

(30) Foreign Application Priority Data

May 5, 2020 (SG) ........................... 10202004140Y

(51) Int. Cl.
*H01J 49/04* (2006.01)

(52) U.S. Cl.
CPC ...... *H01J 49/0404* (2013.01); *H01J 49/0431* (2013.01); *H01J 49/0459* (2013.01)

(58) Field of Classification Search
CPC ............... H01J 49/0404; H01J 49/0431; H01J 49/0459; H01J 49/0468; H01J 49/049
USPC ......................................... 250/281, 282, 288
See application file for complete search history.

(56) References Cited

U.S. PATENT DOCUMENTS 6,646,253 B1 * 11/2003 Rohwer .............. H01J 49/0422 239/3

FOREIGN PATENT DOCUMENTS

WO 2006065520 A2 6/2006

OTHER PUBLICATIONS

International Search Report and Written Opinion for International Patent Application No. PCT/GB2021/051079, mailed Jul. 29, 2021.
McEwen, C.N., et al., "Analysis of Solids, Liquids, and Biological Tissues Using Solids Probe Introduction at Atmospheric Pressure on Commercial LC/MS Instruments", Analytical Chemistry, 77(23):7826-7831, Dec. 1, 2005.

* cited by examiner

*Primary Examiner* — Michael Maskell
(74) *Attorney, Agent, or Firm* — Goodwin Procter LLP

(57) ABSTRACT

A nozzle for directing heated gas onto the distal end of a capillary arrangeable adjacent the nozzle, the nozzle comprising: a housing defining a plenum for heated gas; and at outlet comprising at least one aperture fluidly connected to the plenum, the outlet configured to direct a curtain of the heated gas onto the distal end of a capillary in use, such that the curtain of heated gas is substantially aligned with the longitudinal axis of the capillary.

15 Claims, 6 Drawing Sheets

ATMOSPHERIC SOLIDS ANALYSIS SOURCE ASSEMBLY

CROSS-REFERENCE TO RELATED APPLICATIONS

Figure 1:
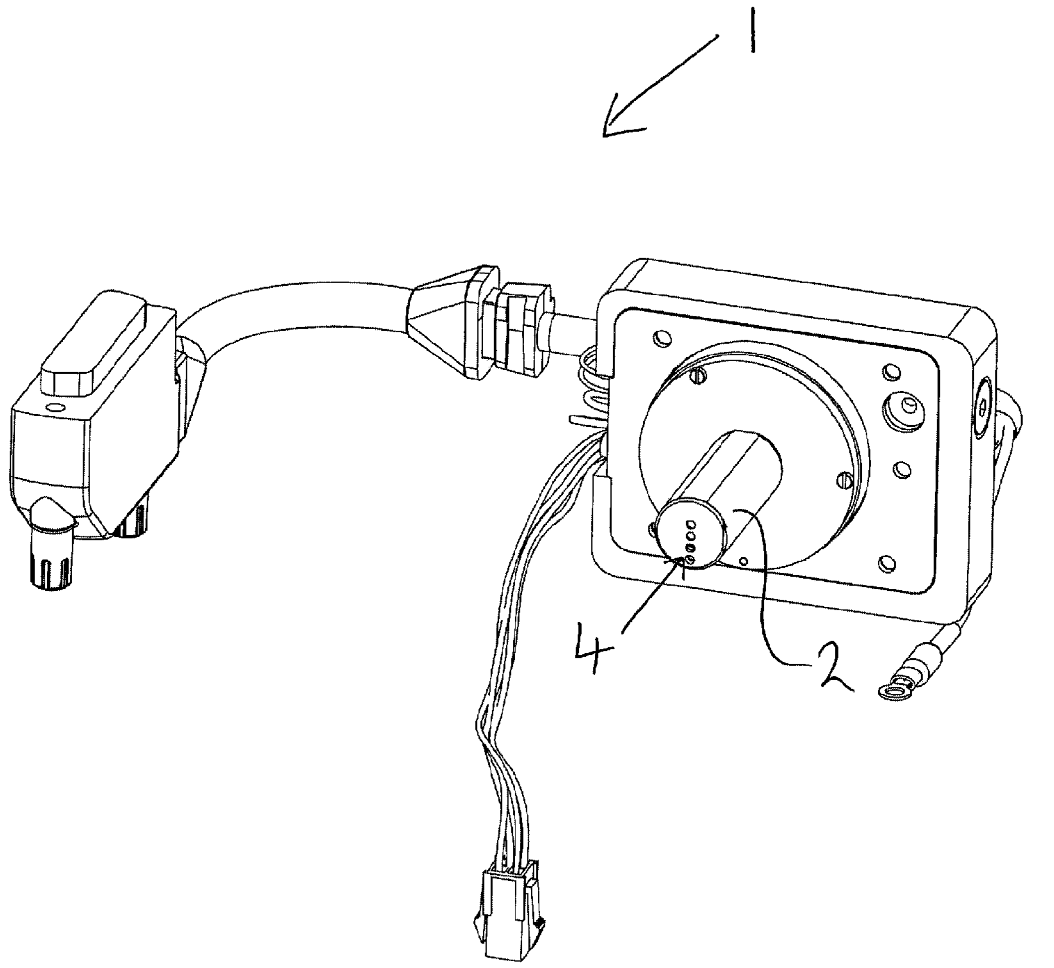

This application is a U.S. national phase filing claiming the benefit of and priority to International Patent Application No. PCT/GB2021/051079, filed May 5, 2021, which claims priority from and the benefit of Singapore Patent Application No. 10202004140Y, filed May 5, 2020. The entire contents of these applications are incorporated herein by reference.

DESCRIPTION OF INVENTION

The present invention relates to a nozzle for directing heated gas onto the distal end of a capillary. The invention further relates to a source assembly including the nozzle.

BACKGROUND OF THE INVENTION

The invention generally relates to an atmospheric solids analysis probe (ASAP). Such probes, and the associated instrument for use with ASAP, are provided by several manufacturers, including Waters Corporation, Milford, MA, U.S.A.

ASAP is a useful and relatively cheap tool for use in the direct analysis of volatile and semi-volatile, solid and liquid samples and may be used in the analysis of specialty chemicals, synthetic polymers, energy sources and food.

A sample is introduced into an ion source housing (e.g. an API source), in which the sample is volatilised using a heated gas, such as nitrogen, and the sample is then ionised using, for example, a corona discharge pin. The ionised sample may subsequently be analysed in a mass spectrometer.

The sample is introduced into the source by loading it onto the tip of a capillary. The capillary may comprise a conventional glass capillary. The capillary may be a solid rod, or a tube, with open ends.

Capillaries are fragile and susceptible to contamination. To ensure reliable and accurate analysis, the tip of the capillary must be inserted into the source in a repeatable manner.

To assist in the loading of a capillary into a source, it is known to provide a holder comprising a clamp mechanism which serves to retain the proximal end of the capillary (opposite the tip at the distal end which carries a sample) in the capillary holder. This may provide a user with a more robust method of handling the capillary, and may also assist in the guiding of the capillary into the source. The capillary holder, and/or the source instrument, may comprise a guide mechanism to ensure the correct alignment of the capillary as it is loaded into the source.

When the capillary is arranged in the ion source housing, the distal end of the capillary is arranged adjacent the outlet of a nozzle for directing heated gas onto the capillary. The outlet may comprise a single circular aperture, which may be configured to optimise the velocity and flow rate of a heated gas exiting the outlet and being directed onto the distal end of the capillary. However, the "beam" of hot gas leaving a single circular aperture may not be broad enough so as to effectively heat and vaporise substantially all of a sample provided on the distal end of the capillary.

If a significant amount of the sample is not adequately heated by the nozzle, it may subsequently not be effectively volatilised into the gas phase and hence would not be ionised by the corona discharge pin. This may then reduce the speed and accuracy of the subsequent measurement. Ineffective volatilisation through incomplete heating of the sampling region may result in extended analysis times, with high mass high boiling point compounds being volatilised over such an extended period that it may manifest as undesirable background in the mass spectrum and subsequent analyses.

Increasing the size of the single circular aperture, and thus the diameter of the beam of hot gas, may adversely affect the velocity and/or flow rate of the heated gas, and may also adversely affect the temperature of the heated gas as it leaves the outlet of the nozzle. In turn, this may adversely affect the measurements derived from the ionised sample.

Moreover, in use, it may not be possible to achieve positional accuracy of the distal end of the capillary tip relative to the outlet of the heater. This may be due to tolerance stack-up of the various mechanical arrangements of the ASAP assembly (e.g. the clamp, the guide mechanism and/or the ion source housing). Accordingly, even if the capillaries used are of substantially the same length, the position of the distal end of one capillary relative to the outlet of the heater may differ to the position of another capillary relative to the outlet of the heater. Thus, even if the position of a single aperture outlet relative to the distal end is optimal for one capillary, it may not be optimal for a subsequent capillary loaded into the source assembly.

The present invention seeks to address at least one of the aforementioned problems.

Accordingly, the present invention provides a nozzle for directing heated gas onto the distal end of a capillary arrangeable adjacent the nozzle, the nozzle comprising:

- a housing defining a plenum for heated gas; and
- at outlet comprising at least one aperture fluidly connected to the plenum, the outlet configured to direct a curtain of the heated gas onto the distal end of a capillary in use, such that the curtain of heated gas is substantially aligned with the longitudinal axis of the capillary.

In at least one embodiment, the outlet comprises a plurality of apertures arranged substantially linearly.

In at least one embodiment, the outlet comprises four apertures.

In at least one embodiment, each of the apertures has substantially the same surface area.

In at least one embodiment, each of the apertures is substantially circular.

In at least one embodiment, the aperture(s) is/are non-circular.

In at least one embodiment, the aperture(s) is/are elongated.

In at least one embodiment, the outlet comprises a single elongate aperture.

In at least one embodiment, the outlet comprises a plurality of elongate apertures, wherein the direction of elongation is substantially perpendicular to the plane of the curtain of heated gas.

In at least one embodiment, the nozzle further comprises a heater arrangement, for heating gas in the plenum.

In at least one embodiment, the housing comprises a cylindrical outer sleeve and a substantially planar plate at the distal end of the sleeve, wherein the outlet is provided in said plate.

In at least one embodiment, the nozzle further comprises a gas source, for delivering a gas to the plenum.

In at least one embodiment, the gas is nitrogen.

The present invention further provides a source assembly comprising:

a source housing, configured to receive at least the distal end of a capillary therein; and a nozzle according to the invention, received in the source housing, configured such that, in use, the curtain of heated gas is substantially aligned with the longitudinal axis of the capillary.

In at least one embodiment, the source assembly further comprises a capillary, wherein the distal end of the capillary is received in the source assembly and the curtain of heated gas is substantially aligned with the longitudinal axis of the capillary.

Figure 2A:
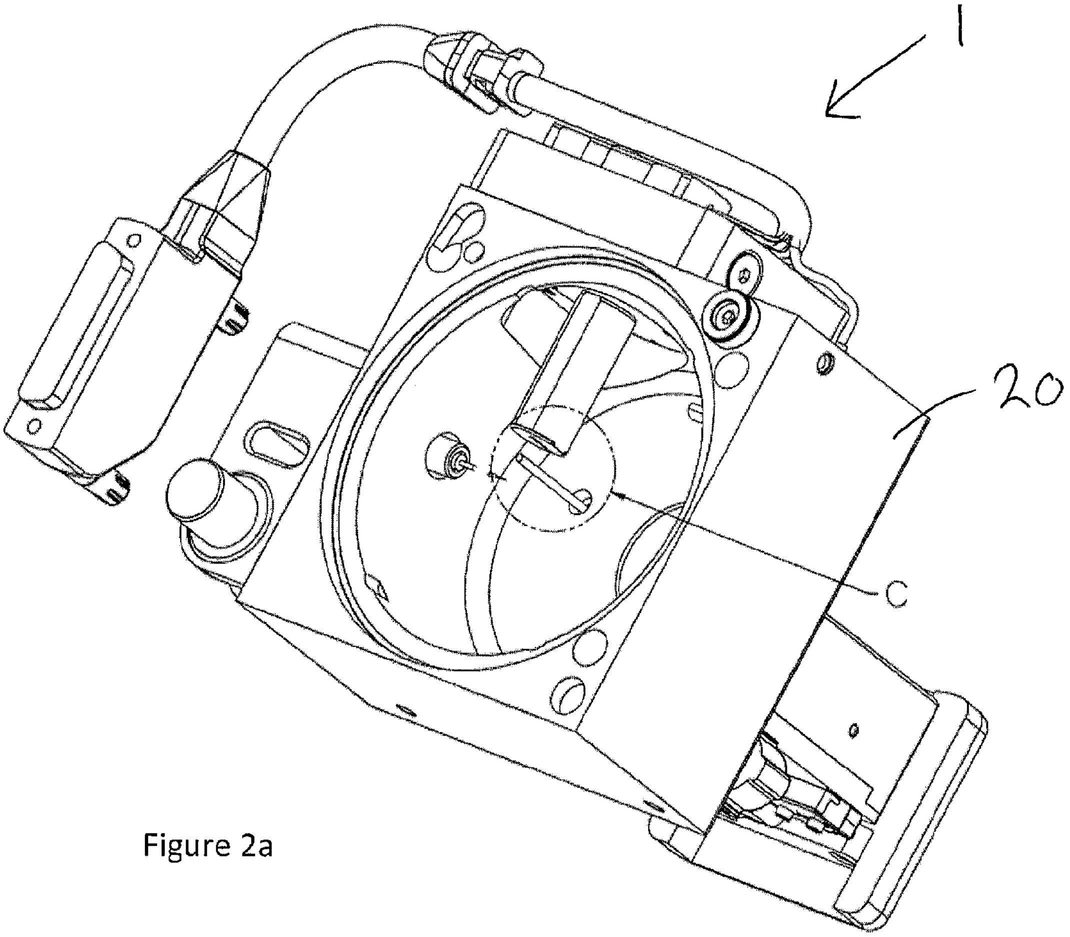
Figure 2B:
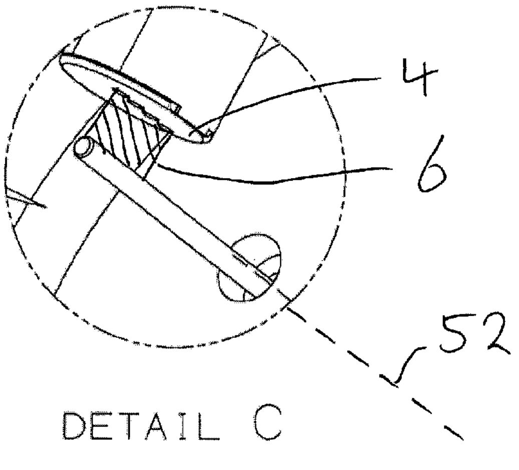

Embodiments of the present invention will now be described, by way of non-limiting example only, with reference to the following figures in which:

FIG. 1 illustrates a nozzle embodying the present invention;

FIG. 2*a* illustrates a source assembly including a nozzle embodying the present invention;

FIG. 2*b* illustrates the detail C of FIG. 2*a;*

Figure 4A:
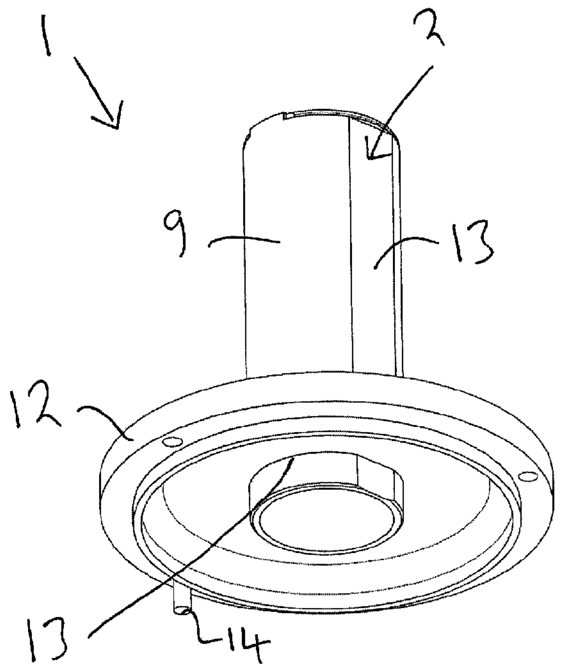
Figure 4B:
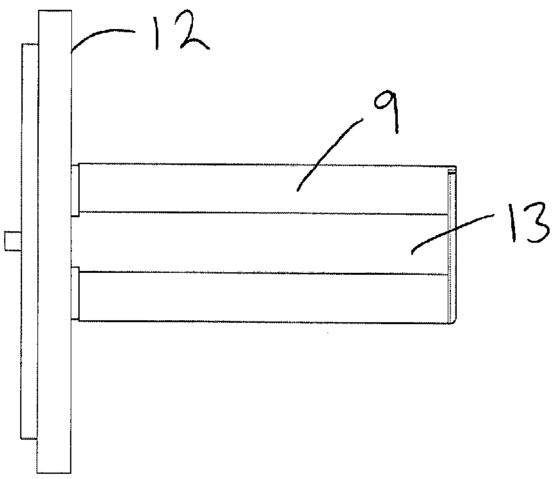
Figure 4C:
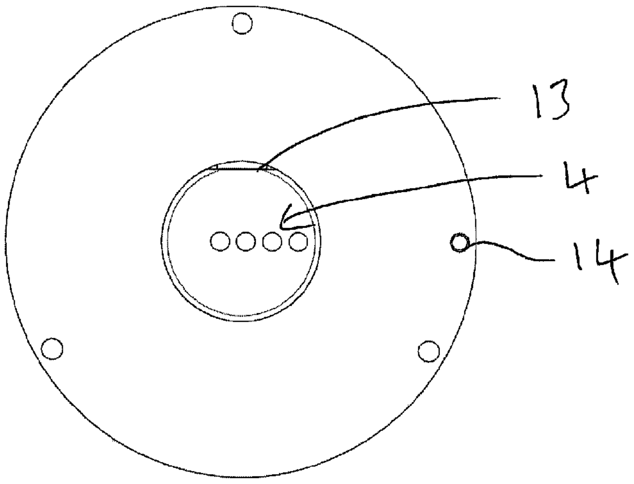
Figure 5:
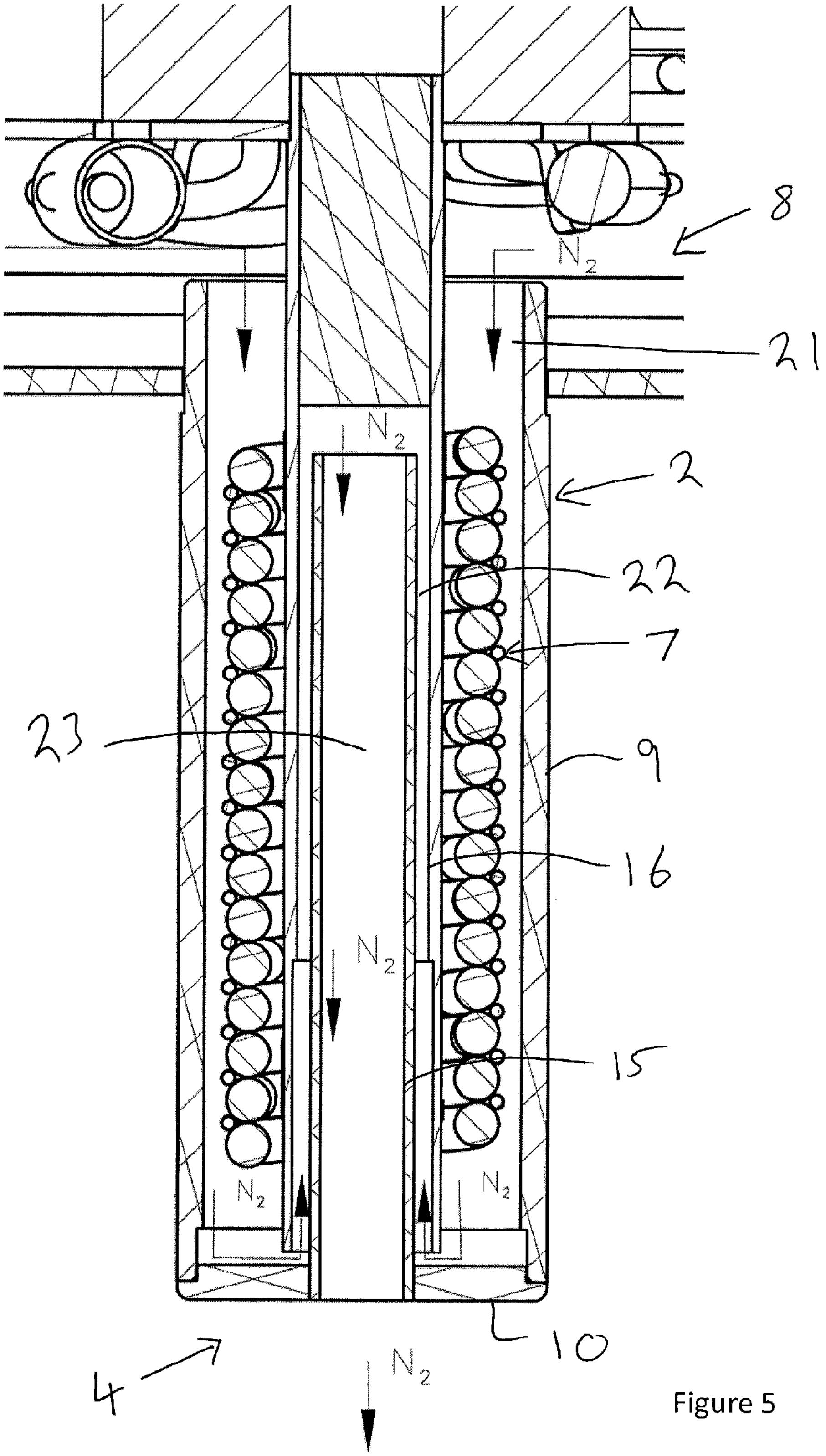
Figure 6:
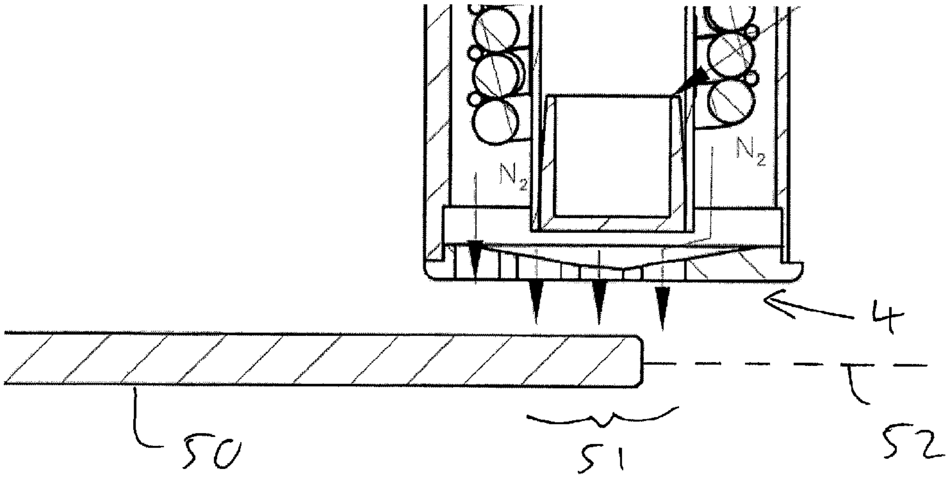

FIGS. 3*a* to 3*d* illustrate various embodiments of the outlet of a nozzle embodying the present invention;

FIGS. 4*a* to 4*c* illustrate a nozzle embodying the present invention;

FIG. 5 illustrates a cross-sectional view of a nozzle embodying the present invention; and FIG. 6 illustrates the positioning of the distal end of a capillary relative to the outlet of the nozzle in use.

FIG. 1 illustrates a nozzle 1 embodying the present invention. The nozzle 1 is for directing a heated gas onto the distal end 51 of a capillary 50 arrangeable adjacent the nozzle 1, shown in FIG. 6.

The nozzle 1 comprises a housing 2 defining a plenum 3 for a heated gas.

The nozzle 1 further comprises an outlet 4 comprising at least one aperture 5. The outlet 4 is fluidly connected to the plenum 3. The outlet 4 is configured to direct a curtain 6 of the heated gas onto the distal end 51 of the capillary 50. The curtain 6 of heated gas is substantially aligned with the longitudinal axis 52 of the capillary 50, which is shown in FIGS. 6 and 2*b*.

The curtain 6 of heated gas has a plane and the longitudinal axis of the capillary 50 is substantially aligned with that plane. Although absolute alignment may be preferable, substantial alignment of the curtain 6 of heated gas with the longitudinal axis 52 of the capillary 50 may be acceptable. For example, the angle of the longitudinal axis 52 of the capillary 50 relative to the plane of the curtain 6 of heated gas may be within a tolerable range. The range may be between −10° to +10°, −5° to +5°, −2.5° to +2.5°, or between −1° and +1°.

The curtain 6 of heated gas has a width and a length. The length is longer than the width. Accordingly, the curtain 6 of heated gas directed from the outlet 4 of a nozzle 1 embodying the present invention is effectively "elongated". This contrasts to the circular beam of hot gas provided by a single circular aperture of an arrangement falling outside of the claimed invention (discussed above). A benefit of an outlet 4 of the claimed invention providing a curtain 6 of heated gas is that it may provide more effective coverage of the distal end 51 of the capillary 50, ensuring that more of a sample provided on the distal end 51 of the capillary 50 is effectively heated (as compared to a single circular aperture of an arrangement falling outside of the scope of the claimed invention). Without a curtain of heated gas being provided by embodiments of the present invention, there may not be effective coverage of the heated gas on the distal end 51 of the capillary 50. Some of the sample may not then be heated directly by the heated gas stream, but instead through latent heat conduction in the capillary, sample or any coating which may be on the capillary tip. This may skew the measurements obtained.

The width of the curtain 6 may be configured so as to be substantially equal to the diameter/width of the capillary 50, and the length of the curtain 6 may be configured to be substantially equal to the length of the distal end 51 of the capillary 50 provisioned to retain sample.

FIGS. 3*a* to 3*d* illustrate various arrangements of an outlet 4 of a nozzle 1 embodying the present invention.

Figure 3A:
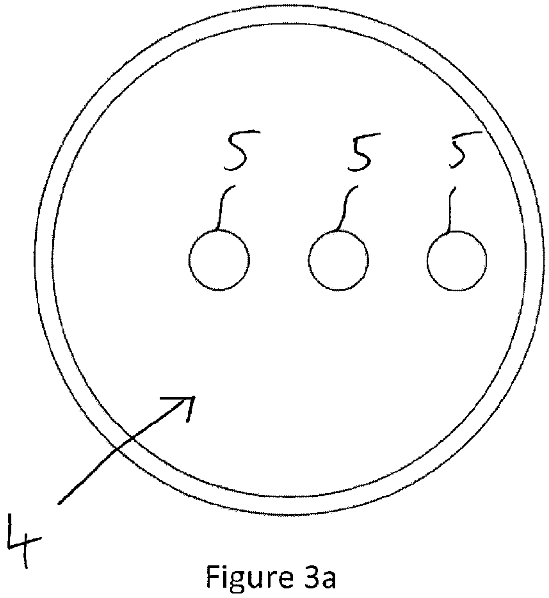

In FIG. 3*a*, the outlet 4 comprises three apertures 5. Each of the apertures 5 is substantially circular. The apertures 5 are arranged in a line and evenly distributed therealong. This is not essential. In alternative embodiments, not shown, each of the apertures 5 may be of a different size and/or shape. The middle of the three apertures 5 may be closer to one of the outer apertures 5 than to the other.

Figure 3B:
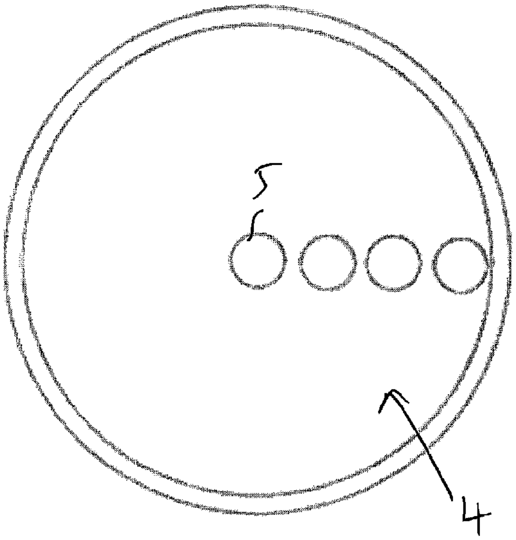

The outlet 4 in FIG. 3*b* comprises four circular apertures 5, all of substantially the same size, and linearly distributed. As with the arrangement in FIG. 3*a*, the apertures 5 may alternatively be of different size and/or shape, and may be distributed differently to that shown in FIG. 3*a*.

In other embodiments of the present invention, there may be provided two circular apertures 5. In other embodiments, there may be provided five, six, seven, eight or more apertures 5.

In FIG. 3*b*, an aperture 5 at one end of the series of apertures 5 is substantially aligned with the central axis of the nozzle 1. This is not essential. In the arrangement shown in FIG. 3*a*, the series of apertures 5 extends across the central axis of the nozzle 1. The outlet 4 of a nozzle 1 embodying the present invention may be configured such that the curtain 6 of heated gas is offset from the central axis of the nozzle 1, or it may be centrally aligned.

Figure 3C:
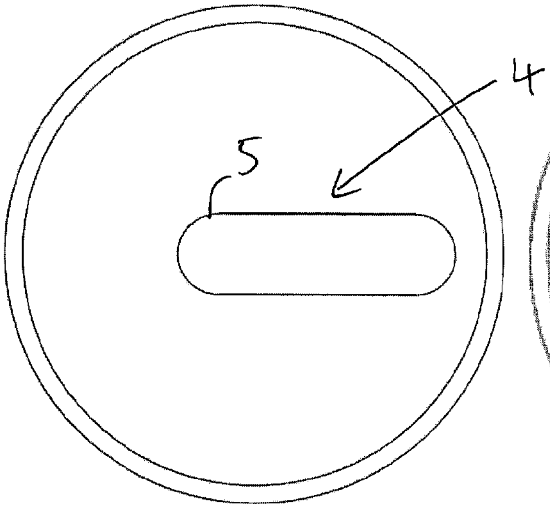

FIG. 3*c* illustrates an outlet 4 of another nozzle 1 embodying the present invention, comprising a single aperture 5. The aperture 5 is non-circular and elongated. As will be noted from FIG. 3*c*, the length of the aperture 5 is greater than the width. Consequently, the outlet of the arrangement shown in FIG. 3*c* produces a curtain 6 of heated gas. This is in contrast to the circular beam of heated gas that would be produced by a single circular aperture, such as discussed above.

Figure 3D:
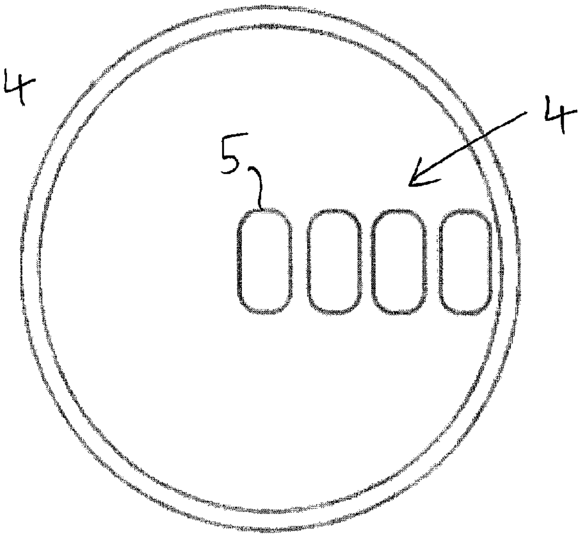

FIG. 3*d* shows an outlet 4 of a nozzle 1 according to another embodiment of the present invention. In this embodiment, the outlet 4 comprises a plurality of apertures 5 (four in this example), and each of the apertures 5 is elongated. The direction of elongation is substantially perpendicular to the plane of the curtain 6 of heated gas produced by the outlet. It will be appreciated that with the configuration of the outlet 4 illustrated in FIG. 3*d*, the elongate apertures 5 increase the width of the curtain 6 as compared to an arrangement comprising four circular apertures 5.

In other embodiments falling within the scope of the claims, the apertures 5 may take different forms to those illustrated and/or a combination of those illustrated in FIGS. 3*a* to 3*d*. For example, the outlet 4 may comprise a plurality of apertures 5, wherein at least one of the apertures 5 is circular and at least one of the apertures 5 is elongate. In an embodiment comprising a plurality of elongate apertures 5, the direction of elongation of one aperture 5 may differ to the direction of elongation of another aperture 5 of that outlet 4.

In at least one embodiment, the total surface area of the aperture(s) 5 of an outlet 4 of a nozzle 1 embodying the present invention may be in the range 8 to 8.5 $mm^2$. In one embodiment, the total surface area may be within the range 8.1 to 8.4 $mm^2$. In another embodiment, the range may be between 8.2 to 8.3 $mm^2$. In another embodiment, the total surface area may be 8.245 $mm^2$.

In embodiments of the present invention, the nozzle 1 may be configured so as to deliver heated gas through the outlet 4 at a flow rate of between 1 and 4 litres per minute. In another embodiment, the flow rate may be between 2 and 3 litres per minute In another embodiment, the flow rate may be between 2.3 and 2.7 litres per minute. In another embodiment, the flow rate may be substantially 2.5 litres per minute. In another embodiment, the flow rate may be substantially 4 litres per minute.

As shown in FIG. 5, the nozzle 1 may further comprise a heater arrangement 7, for heating gas in the plenum 3. The nozzle 1 may further comprise a gas source 8. The gas is preferably nitrogen. The gas source 8 may be configured so as to introduce gas into the plenum 3 of the nozzle 1. The heater arrangement 7 is arranged so as to heat the gas introduced into the plenum 3. The heater arrangement 7 may be arranged in the path of the gas entering the plenum 3 from the gas source 8, so as to effectively heat the gas using the heater arrangement 7.

The housing 2 comprises a cylindrical outer sleeve 9 and a substantially planar plate 10 at the distal end of the sleeve 9. The outlet 4 is provided in the plate 10. The cylindrical outer sleeve 9 and the plate 10 are hermetically sealed so as to define the plenum 3 therein. Preferably, any heated gas within the plenum 3 may only leave the plenum 3 through the outlet 4 (assuming that the gas source 8 communicating with the plenum 3 provides a positive pressure and/or a one-way valve).

The planar nature of the plate 10 is not essential. The reader will appreciate that it may take other forms, such as concave or convex. The cylindrical nature of the outer sleeve 9 is also not essential. In other forms it may be non-circular, such as having a square or rectangular cross-section. Correspondingly, the shape of the plate 10 may be non-circular, depending on the cross-sectional shape of the outer sleeve 9.

As shown in FIGS. 4*a* to 4*c*, a nozzle 1 may further comprise a mounting flange 12, which may be substantially planar. The outer sleeve 9 of the nozzle 1 may be received in an aperture 13 in the mounting flange 12, as shown in FIG. 4*a*.

In at least one embodiment, as best illustrated in FIGS. 4*a* to 4*c*, the outer sleeve 9, rather than being entirely cylindrical, may comprise at least one flat section 13 extending along the longitudinal length of the sleeve 9. The aperture 13 in the mounting flange 12 may be similarly shaped, so as only to receive the outer sleeve 9 of the nozzle 1 therein in a predetermined orientation. The mounting flange 12 further comprises an alignment feature 14, in the form of a pin, seen in FIGS. 4*a* to 4*c*.

In at least one embodiment, the source housing 20 comprises a corresponding aperture which receives the locating pin 14. Accordingly, since the angular alignment of the locating pin 14 is set in relation to the outlet 4 of the nozzle 1, by virtue of the flat portion 13 on the outer sleeve 9, the position of the outlet 4 of the nozzle 1 is consequently fixed relative to the source housing 20. Accordingly, as shown in FIG. 2*b*, the locating pin 14 ensures that the nozzle 1 is inserted into the source housing 20 in a repeatable fashion such that the curtain 6 of heated gas is substantially aligned with the longitudinal axis 52 of the capillary 50 in use.

In at least one embodiment, the nozzle 1 is configured such that it can be only inserted into the source housing 20 in a single orientation.

A benefit of the provision of the flat portion 13 on the outer sleeve 9 is that it aids assembly and manufacture of the nozzle 1. During manufacture, the outer sleeve 9 may be inserted into the aperture 13 in the mounting flange 12 in a particular orientation, and then the outer sleeve 9 can be secured to the mounting flange 12, for example by welding or otherwise.

As shown in FIG. 5, the nozzle 1 may further comprise an inner sleeve 15 and an intermediate sleeve 16 within the plenum. The intermediate sleeve 16 is arranged between the outer 9 and inner 15 sleeves. The outer 9, intermediate 16 and inner 15 sleeves create a labyrinthine/tortuous path for the passage of gas from the gas source 8 to the outlet 4. In the embodiment shown in FIG. 5, a heating element of the heater arrangement 7 is provided between the outer 9 and intermediate 16 sleeves. Gas may enter one end of a first section 21, between the outer 9 and intermediate 16 sleeves, and pass through to the end of the first section 21. From there, the gas may enter a second section 22 between the intermediate 16 and inner 15 sleeves. As it does so, the gas passes through the heater arrangement 7 once more. In at least one embodiment, the intermediate sleeve 16 may be conductive and promote heat transfer into the gas. Finally, the gas may pass into a third section 23, inside the inner sleeve 15, again passing through the heater arrangement 7, further heating the gas.

The heated gas then exits the inner sleeve 15 through the outlet 4. A benefit of the provision of the inner 15 and intermediate 16 sleeves is that the path over which the gas is in contact with the heater arrangement 7 is increased, thereby increasing the efficiency of the heater arrangement 7.

When used in this specification and claims, the terms “comprises” and “comprising” and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A nozzle for directing heated gas onto the distal end of a capillary arrangeable adjacent the nozzle, the nozzle comprising:
- a housing defining a plenum for heated gas; and
- at outlet comprising at least one aperture fluidly connected to the plenum, the outlet configured to direct a curtain of the heated gas onto the distal end of a capillary in use, such that the plane of the curtain of heated gas is substantially aligned with the longitudinal axis of the capillary.

2. A nozzle according to claim 1, wherein the outlet comprises a plurality of apertures arranged substantially linearly.

3. A nozzle according to claim 1, wherein the outlet comprises four apertures.

4. A nozzle according to claim 2, wherein each of the apertures has substantially the same surface area.

5. A nozzle according to claim 2, wherein each of the apertures is substantially circular.

6. A nozzle according to claim 1, wherein the aperture(s) is/are non-circular.

7. A nozzle according to claim 6, wherein the aperture(s) is/are elongated.

8. A nozzle according to claim 6, wherein the outlet comprises a single elongate aperture.

9. A nozzle according to claim 6, wherein the outlet comprises a plurality of elongate apertures, wherein the direction of elongation is substantially perpendicular to the plane of the curtain of heated gas.

10. A nozzle according to claim 1, further comprising a heater arrangement, for heating gas in the plenum.

11. A nozzle according to claim 1, wherein the housing comprises a cylindrical outer sleeve and a substantially planar plate at the distal end of the sleeve, wherein the outlet is provided in said plate.

12. A nozzle according to claim 1, further comprising a gas source, for delivering a gas to the plenum.

13. A nozzle according to claim 12, wherein the gas is nitrogen.

14. A source assembly comprising:

a source housing, configured to receive at least the distal end of a capillary therein; and a nozzle according to claim 1, received in the source housing, configured such that, in use, the curtain of heated gas is substantially aligned with the longitudinal axis of the capillary.

15. A source assembly according to claim 14, further comprising a capillary, wherein the distal end of the capillary is received in the source assembly and the curtain of heated gas is substantially aligned with the longitudinal axis of the capillary.

* * * * *